(12) United States Patent
Peck et al.

(10) Patent No.: US 9,164,505 B1
(45) Date of Patent: Oct. 20, 2015

(54) AUTOMATIC REJECTED TAKEOFF SYSTEM

(75) Inventors: Andrew J. Peck, Renton, WA (US); David Jeffrey Halaas, Buckley, WA (US); Adam Marshall Thoreen, Lake Stevens, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/477,860

(22) Filed: May 22, 2012

(51) Int. Cl.
*G05D 1/00* (2006.01)

(52) U.S. Cl.
CPC ........................................ *G05D 1/00* (2013.01)

(58) Field of Classification Search
CPC ......... G06G 7/78; B60T 8/1703; B60T 8/174; B60T 8/0083; G05D 1/0083; G05D 1/0661; G05D 7/78; G05D 5/025; G05D 1/0607
USPC ............... 701/3, 15, 120; 244/111; 73/178 T; 60/778
See application file for complete search history.

(56) References Cited

U.S. PATENT DOCUMENTS

| | | |
|---|---|---|
| 3,920,204 A | 11/1975 | Bissell et al. |
| 4,837,695 A | 6/1989 | Baldwin |
| 5,047,942 A | 9/1991 | Middleton et al. |
| 5,519,391 A | 5/1996 | Paterson et al. |
| 5,968,106 A | 10/1999 | DeVlieg et al. |
| 6,643,568 B2 | 11/2003 | Chatrenet et al. |
| 6,880,784 B1 * | 4/2005 | Wilkinson et al. .......... 244/76 R |
| 6,991,304 B2 | 1/2006 | Villaume |
| 7,014,146 B2 | 3/2006 | Villaume et al. |
| 7,281,683 B2 | 10/2007 | Delaplace et al. |
| 7,364,121 B2 | 4/2008 | Firuz et al. |
| 2002/0021230 A1 * | 2/2002 | Johnson ....................... 340/945 |
| 2004/0059497 A1 * | 3/2004 | Sankrithi ....................... 701/120 |
| 2004/0107027 A1 * | 6/2004 | Boudrieau ......................... 701/1 |
| 2004/0239173 A1 * | 12/2004 | Williams et al. ................. 303/3 |
| 2008/0033604 A1 * | 2/2008 | Margolin .......................... 701/2 |
| 2008/0154445 A1 * | 6/2008 | Goodman et al. ................ 701/3 |
| 2008/0215198 A1 * | 9/2008 | Richards ........................ 701/15 |
| 2010/0324755 A1 * | 12/2010 | Zammit-Mangion ............. 701/3 |
| 2011/0040431 A1 * | 2/2011 | Griffith et al. .................. 701/15 |
| 2011/0118909 A1 * | 5/2011 | Ishihara et al. ................. 701/15 |
| 2013/0116862 A1 * | 5/2013 | Griffith et al. .................... 701/3 |

OTHER PUBLICATIONS

B737NG Briefings, "Rejected Takeoff", smartcockpit.com; Jan. 2008 file name: B737-Rejected_Takeoff_rev_03.*

* cited by examiner

*Primary Examiner* — Helal A Algahaim
*Assistant Examiner* — Jelani Smith
(74) *Attorney, Agent, or Firm* — Weiss & Moy, P.C.

(57) ABSTRACT

A method for automatic rejection takeoff (RTO) of an aircraft monitors a plurality of sensors for an RTO event. Signals are sent to control systems of the aircraft to perform an RTO when the RTO event occurs.

19 Claims, 4 Drawing Sheets

AUTOMATIC REJECTED TAKEOFF SYSTEM

BACKGROUND

Embodiments of this disclosure relate generally to aircraft, and more particularly, to a system and method to automatically initiate a rejected takeoff procedure based on predetermined airplane alert signals.

A rejected takeoff (hereinafter RTO) may be a situation in which it is decided to abort the takeoff of an aircraft. There may be many reasons for deciding to perform a RTO. In general, a RTO may be performed due to suspected or actual technical failure or flight hazard.

A RTO may be comprised of a series of maneuvers to stop the takeoff roll of an aircraft once the thrust has been raised and the takeoff has begun. Presently, an operator of an aircraft may be required to detect a specific event, for example an engine fire, by using audible and or visual cues and or alerting signals or other tactile cues available to the aircraft operator. If the event occurs below a takeoff decision speed, commonly referred to as V1, there generally is enough runway remaining to stop the aircraft and the pilot needs to initiate a RTO immediately upon detection of the RTO generating event.

Presently, an aircraft crew generally needs to detect the RTO generating event using the aforementioned alerting, process this information, and start configuring the aircraft for stopping. Historically, in-service reaction times, the result of which stopping distance is heavily dependent on, have not been as fast as what is seen in Flight Test (~1 second), or even what is printed in the Airplane Flight Manual (~3-4 seconds). Incidents and airline data show reaction times much longer for a crew to detect and initiate the RTO response. Delays in initiating the RTO response may increase the risk of aircraft overrun, airplane/occupant damage or injury, and the like.

Therefore, it would be desirable to provide a system and method that overcomes the above.

SUMMARY

A method for automatic rejected takeoff (RTO) of an aircraft monitors a plurality of sensors for an RTO event. Signals are sent to control systems of the aircraft to perform an RTO when the RTO event occurs.

An automatic rejected takeoff (RTO) system for an aircraft has a plurality of sensors for monitoring a plurality of aircraft operating parameters. A control unit is coupled to the sensors for receiving signals from the sensors and initiating a RTO if at least one of the sensors indicates a RTO event.

A method for an automatic rejected takeoff (RTO) for an aircraft comprises: providing an automatic RTO system; monitoring a plurality of sensors for an RTO event by the automatic RTO system; and sending signals to control systems of the aircraft by the automatic RTO system to perform an RTO when the RTO event occurs.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
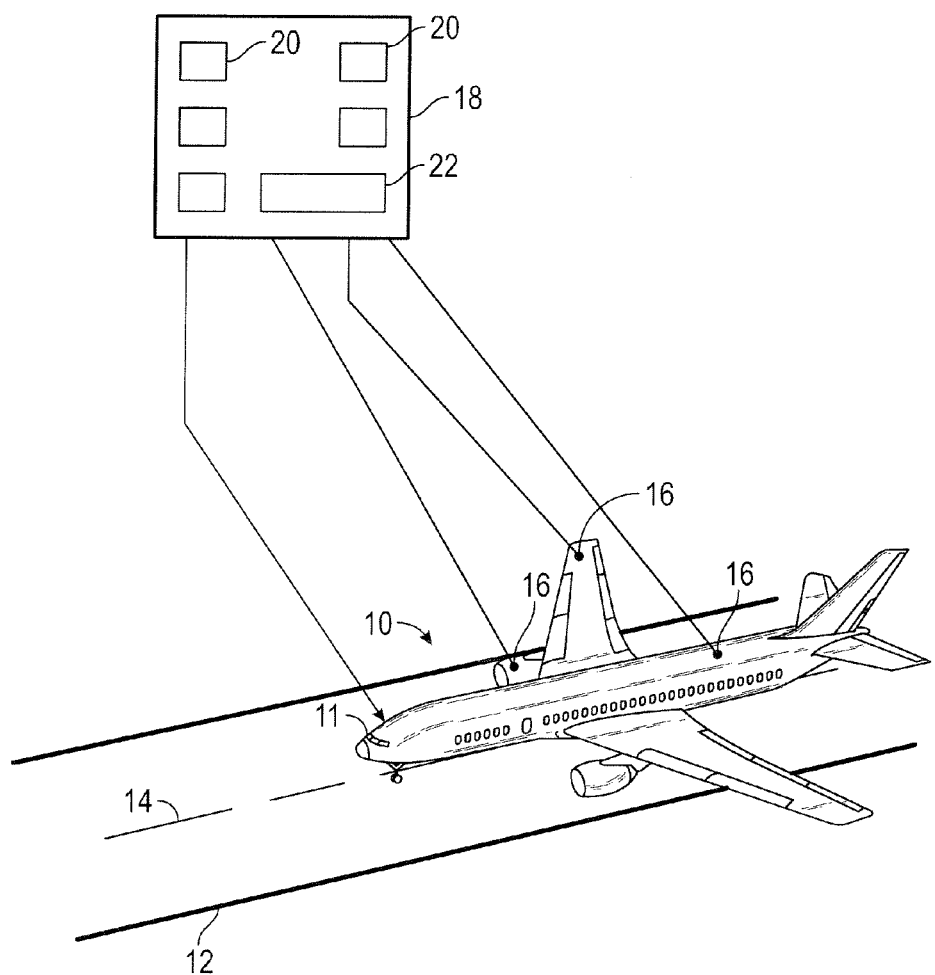
FIG. 1 is a perspective view of an aircraft positioned on a runway for takeoff.

Referring to FIG. 1, an aircraft 10 is shown on a runway 12. The runway 12 may have a runway centerline 14. The runway centerline 14 may be used to guide the aircraft 10 during takeoff and landings.

As the aircraft 10 goes down the runway, situations may occur in which it is decided to perform a rejected take off (RTO). The total energy that may be dissipated during the RTO may be proportional to the square of the aircraft velocity. At low speeds, up to approximately 80 knots, the energy level is generally low. Therefore, the aircraft 10 may be stopped for a variety of events that may be considered undesirable for continued takeoff roll or flight.

As the airspeed of the aircraft 10 approaches V1, the effort required to stop the aircraft 10 can approach the airplane maximum stopping capability. Therefore, the decision to perform a RTO beyond 80 knots and below V1 should be made only for specific hazardous conditions which threaten safety of flight. Performing a RTO at or past V1 may result in the aircraft 10 stopping beyond the end of the runway 12 causing damage to the aircraft 10 and or injury to passengers and flight crew. Decision delay at high speeds greatly increases these risks.

The aircraft 10 may have a plurality of sensors 16 located throughout the aircraft 10. The sensors 16 may be configured to monitor different conditions on the aircraft 10 as well as for monitoring different operating conditions of one or more aircraft systems. Some of the sensors 16 may be configured to monitor operating conditions and or situations relating to a RTO event. For example, one or more of the sensors 16 may be used to indicate a fire on the aircraft 10, in the aircraft engine, or the like; engine failure; abnormal acceleration of the aircraft 10; tire failure; aircraft structural damage; predictive windshear warning; flight path obstruction; and the like. The above are given as examples of RTO events and should not be seen in a limiting manner.

The sensors 16 may be configured to send signals to a panel 18. The panel 18 may have a plurality of indicators 20. The indicators 20 may be configured to provide a visual and or audible indication of the current state of the different sensors 16. The panel 18 may be located in a cockpit section 11 of the aircraft 10.

The aircraft 10 may have an Automatic Rejected Take Off (ARTO) system 22 (hereinafter ARTO 22). The ARTO 22 may be configured to automatically perform a RTO procedure should a RTO event. The ARTO 22 may decrease and make consistent the time for the aircraft 10 to be configured for stopping, thereby reducing variability due to reaction time, thus increasing stopping margins.

Figure 2:
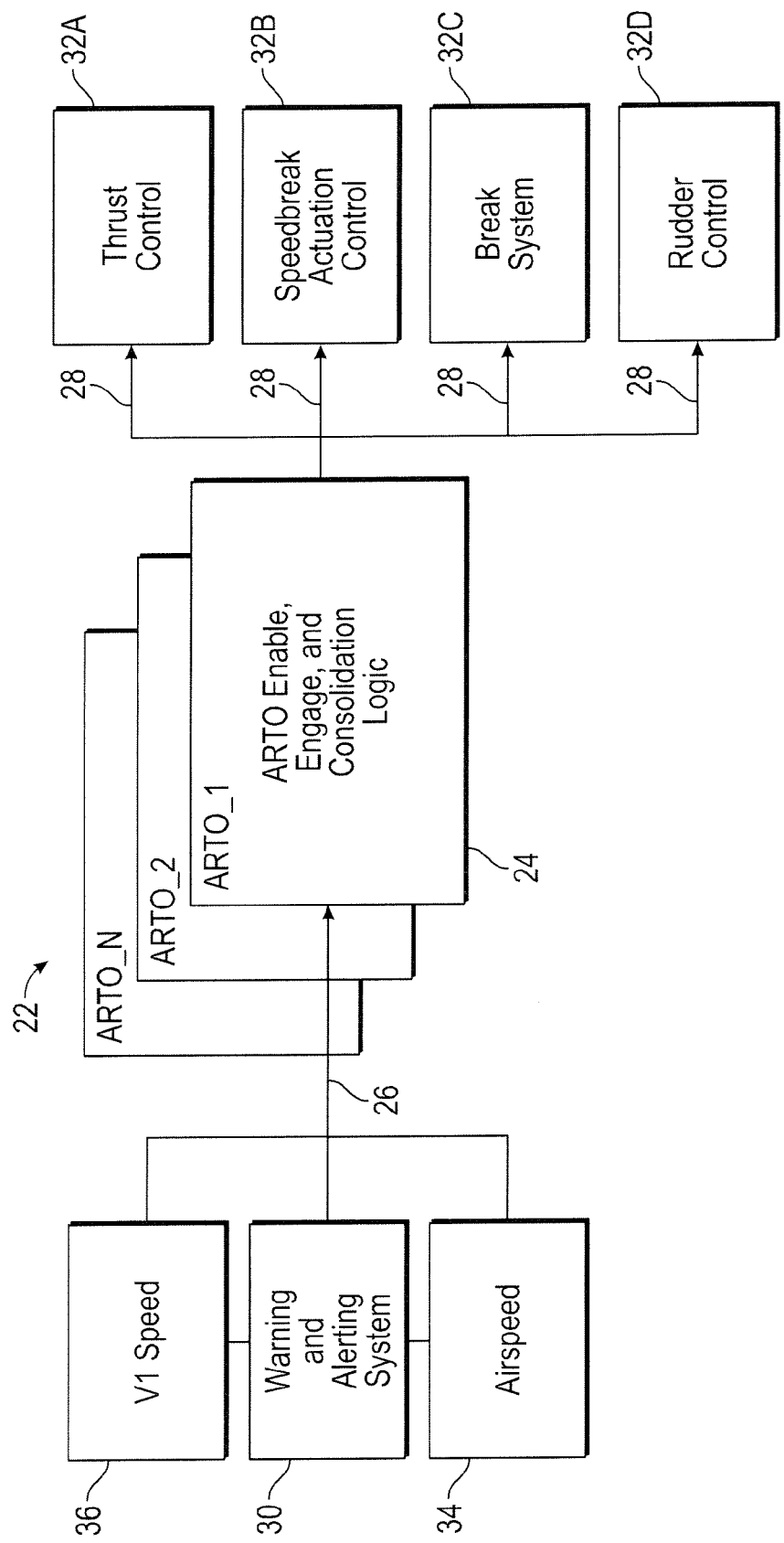
FIG. 2 is a simplified block diagram of an Automatic Rejected Take Off (ARTO) system for an aircraft.

Referring to FIG. 2, the ARTO 22 may have a control block 24. The control block 24 may be used to monitor a plurality of different input signals 26. The control block 24 may be used to monitor the signals 26 and to determine if a RTO event has occurred and if a RTO should be performed. If the control block 24 determines that a RTO should be performed, the control block may be configured to send out signals 28 to one or more control systems 32 to perform a RTO. As shown in FIG. 2, the ARTO 22 may have multiple control blocks 24. Multiple control blocks 24 may be used to provide redundancy to ensure integrity as well as to minimize false activation of the ARTO 22.

The input signals 26 sent to the control block 24 may be sent from one or more sources. The input signals 26 may be generated from a warning/alert system 30 of the aircraft. The warning/alert system 30 may be coupled to a plurality of the sensors 16. The warning/alert system 30 may receive data from the sensors 16 relating to operating conditions of the aircraft and or operating systems of the aircraft 10. The input signals 26 may also be generated by an airspeed monitor 34 and or a V1 speed monitor 36. The airspeed monitor 34 may be a sensor 16 that indicates the current location and or airspeed of the aircraft 10. The V1 speed monitor 36 may be coupled to different sensors 16 which may indicate if the aircraft 10 is at or below V1 speed. V1 may be defined as the critical engine failure recognition speed or takeoff decision speed. It is the decision speed which satisfies all safety rules, and above which the takeoff should continue even if an engine fails. V1 speed may vary between aircraft types and also due to aircraft weight, runway length, wing flap setting, engine thrust used, runway surface contamination and other factors.

The control block 24 may monitor the input signals 26 to determine if a RTO event has occurred and if the aircraft 10 is at or below the V1 speed of the aircraft 10. Thus, the warning/alert system 30 may send signals to the control block 24 when a RTO event occurs such as indication of a fire on the aircraft, in the aircraft engine, or the like; engine failure; abnormal acceleration of the aircraft 10; tire failure; aircraft structural damage; predictive windshear warning; flight path obstruction; and the like. The above are given as examples of RTO events and should not be seen in a limiting manner.

If the warning/alert system 30 sends signals 26 to the control block 24 of a RTO event, and the control block 24 further receives signs 26 indicating that V1 speed has not been exceeded, the control block 24 may generate signals 28 to initiate a RTO. The control block 24 may send signals 28 to different control systems 32 of the aircraft 10 to initiate the RTO. In general, signals 28 may be sent to the trust control 32A, speed brake actuation control 32B, a auto brake system 32C, rudder control 32D and the like. The control signals 28 to the thrust control 32A may be used to retard the thrust levers and to then apply a reverse thrust. Signals 28 may be sent to the speed brake actuation control 32B for deployment of the speed brake and to the brake system 32C for actuation of the auto brake. Signals 28 may be sent to the rudder control 32D to control the yaw of the aircraft 10 and to steer the aircraft along the centerline 14 (FIG. 1) of the runway 12 (FIG. 1).

Figure 3:
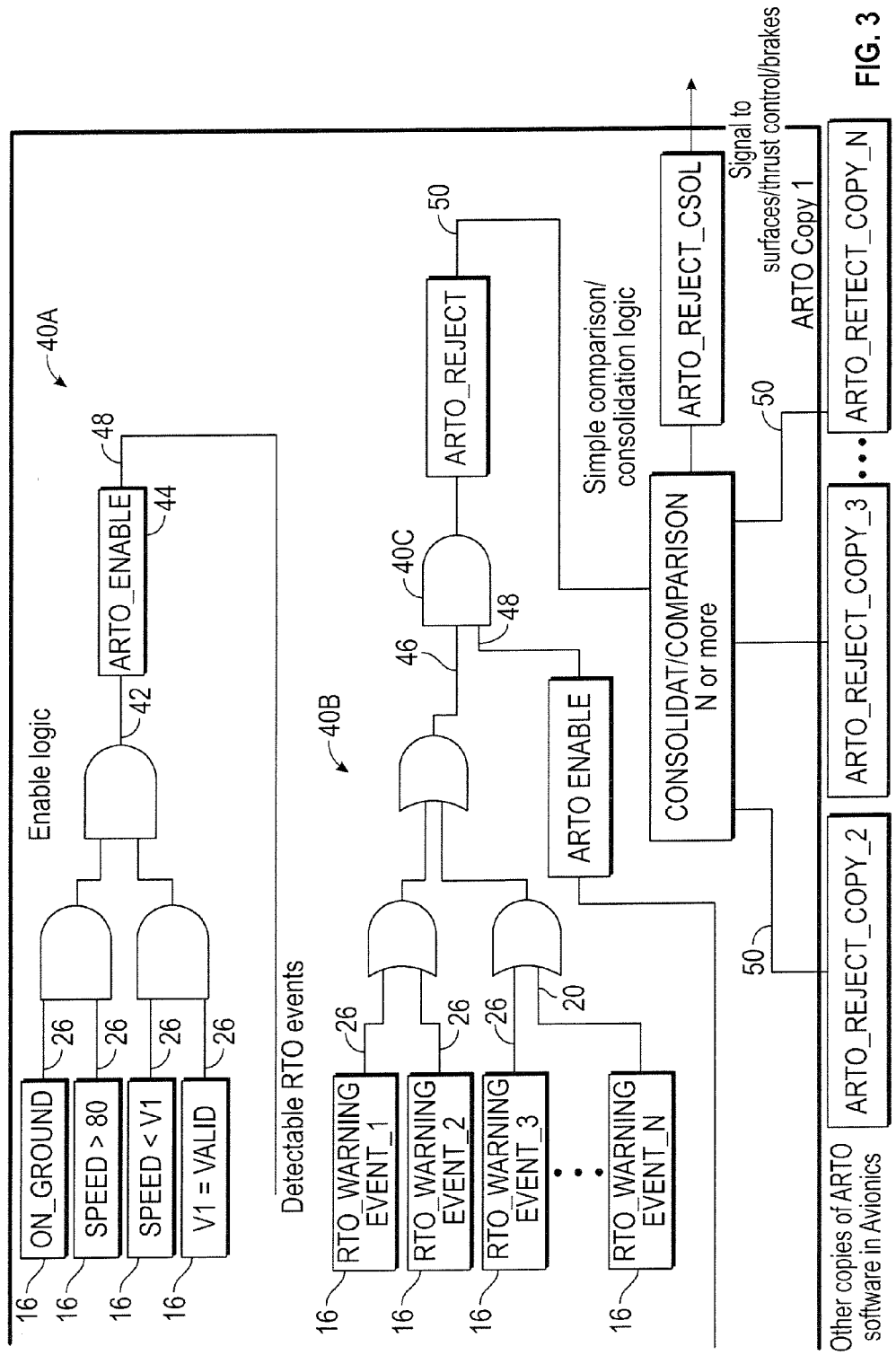
FIG. 3 is a logic diagram of an Automatic Rejected Take Off (ARTO) system for an aircraft.

Referring to FIG. 3, one embodiment of the control logic of the control block 24 is shown. The control block 24 may be configured and or programmed to determine if the ARTO 22 should be enabled and if an RTO event has occurred. The control block 24 may be comprised of logic blocks 40. The logic blocks 40 may be used to determine if the ARTO 22 should be enabled and if an RTO event has occurred. If both conditions have been met, the logic blocks 40 may send a signal to initiate a RTO.

Sensors 16 may be used to monitor if the 22 should be enabled. As shown in FIG. 3, sensors 16 may be used to monitor if the aircraft 10 is on the ground, if the airspeed is less than 80 knots, if speed is less than V1, and if V1 is valid. Readings from sensors 16 to monitor if the ARTO 22 should be enabled may be sent to a first group of logic gates 40A. If the logic gates 40A determine that conditions for enabling the ARTO 20 have been met, a signal 42 is sent to an ARTO Enable Block 44.

Sensors 16 may also be used to monitor if an RTO event has occurred such as indication of a fire on the aircraft, in the aircraft engine, or the like; engine failure; abnormal acceleration of the aircraft 10; tire failure; aircraft structural damage; predictive windshear warning; flight path obstruction; and the like. The above are given as examples of RTO events and should not be seen in a limiting manner. Readings from the sensors 16 that monitor if an RTO event has occurred may be sent to a second group of logic gates 40B. If one or more sensors 16 indicate that an RTO event has occurred, a signal 46 may be sent to a logic gate 40C. Logic gate 46 may receive signals 46 indicating if an RTO event has occurred and signal 48 indicating if the ARTO 20 should be enabled. If both the ARTO 20 should be enabled and an RTO event has occurred, the logic gate 40C sends a signal 50 that a RTO should be initiated.

In a redundant system having multiple control blocks 24, signal 50 from each control block 24 may be sent to a comparison unit 52. Comparison unit 52 may be used to confirm that multiple control blocks 24 agree that an RTO should be initiated. If the comparison block 52 confirms that multiple control blocks 24 indicate that an RTO is to be initiated, the comparison block may send signals 28 to the different control systems 32 to initiate a RTO.

Figure 4:
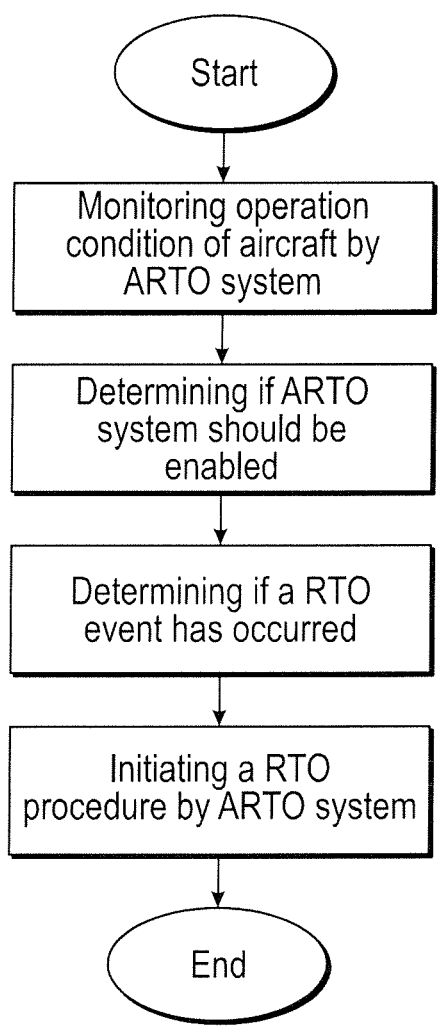
FIG. 4 is a flowchart showing operation of the ARTO system.

Referring to FIG. 4, in operation, one or more control blocks 24 of the ARTO 20 may monitor input signals 26 from one or more sources. The input signals 26 may be generated from one or more systems and or sensors of the aircraft relating to operating conditions of the aircraft 10.

The control block 24 may monitor the input signals 26 to determine if the ARTO 20 should be enabled. If the ARTO 20 is to be enabled, the control block 24 may be used to monitor the input signals 26 to determine if a RTO event has occurred. If the control block 24 monitors a RTO event, the control block 24 may generate signals 28 to initiate a RTO.

The control block 24 may send signals 28 to different control systems 32 of the aircraft 10 to initiate the RTO. In general, signals 28 may be sent to the thrust control 32A, speed brake actuation control 32B, brake system 32C, rudder control 32D and the like. The control signals 28 to the thrust control 32A may be used to retard the thrust levers and to then apply a reverse thrust. Signals 28 may be sent to the speed brake actuation control 32B for deployment of the speed brake and to the brake system 32C for actuation of the auto brake. Signals 28 may be sent to the rudder control 32D to control the yaw of the aircraft 10 and to steer the aircraft along the centerline 14 (FIG. 1) of the runway 12 (FIG. 1).

While embodiments of the disclosure have been described in terms of various specific embodiments, those skilled in the art will recognize that the embodiments of the disclosure may be practiced with modifications within the spirit and scope of the claims.

What is claimed is:

1. A method for automatic rejected takeoff (RTO) of an aircraft, the method comprising:

comparing a first set of input signals from a first plurality of sensors to determine when an Automatic Rejected Takeoff (ARTO) system is enabled, the ARTO system enabled when the first plurality of sensors monitor the aircraft is on ground and a speed of the aircraft is less than a takeoff decision speed V1 for the aircraft;

receiving in a control unit of the ARTO system input signals from a second plurality of sensors to monitor for an occurrence of an RTO event; and sending RTO signals from the control unit to one or more control systems of the aircraft to initiate and perform an RTO responsive to enabling the ARTO system and the occurrence of the RTO event;

wherein said RTO sending signals from the control unit to the one or more control systems of the aircraft comprises:
sending a reverse thrust signal to reverse a thrust of the aircraft in response to the RTO event;
sending a speed brake signal to a speed brake actuation control system of the aircraft in response to the RTO event; and
sending an auto brake signal to an auto brake system of the aircraft in response to the RTO event.

2. The method of claim 1, further comprising:
monitoring the speed of the aircraft; and
determining if the speed of the aircraft is below V1.

3. The method of claim 1, wherein the ARTO system enabled when the first plurality of sensors monitor the speed of the aircraft is below 80 knots.

4. The method of claim 1, further comprising confirming the RTO event has occurred.

5. The method of claim 4, wherein said confirming the RTO event has occurred comprises coupling the second plurality of sensors to a plurality of control units.

6. The method of claim 1, wherein sending signals to control systems of the aircraft to perform the RTO if the RTO event occurs comprises sending a signal to steer the aircraft down a runway.

7. An automatic rejected takeoff (RTO) system for an aircraft comprising:
a plurality of sensors for monitoring a plurality of aircraft operating parameters;
a control unit coupled to the sensors for receiving input signals from the sensors, the control unit configured to enable the automatic RTO system based on comparing a first set of input signals from a first plurality of sensors, the first plurality of sensors monitor if the aircraft is on ground and if a speed of the aircraft is less than a takeoff decision speed V1 for the aircraft and generate one or more RTO signals to initiate a RTO if at least one of the sensors indicates a RTO event, wherein the control unit performs the RTO responsive to an occurrence of the RTO event if the speed of the aircraft is below 80 knots and a takeoff decision speed V1 for the aircraft;
wherein the control unit sends a reverse thrust signal to reverse a thrust of the aircraft in response to the RTO event, sends a speed brake signal to a speed brake actuation control system of the aircraft in response to the RTO event and sends an auto brake signal to an auto brake system of the aircraft in response to the RTO event.

8. The automatic rejected takeoff (RTO) system of claim 7, wherein the control unit enables the RTO system if the speed of the speed of the aircraft is below 80 knots.

9. The automatic rejected takeoff (RTO) system of claim 7, further comprising a plurality of control units.

10. The automatic rejected takeoff (RTO) system of claim 9, wherein each of the control units comprises:
a first logic circuit coupled to the first plurality of sensors for determining if the automatic RTO system should be enabled;
a second logic circuit coupled to the second plurality of sensors for determining the occurrence of the RTO event; and
a third logic circuit configured to initiate a RTO if the automatic RTO system is enabled and the second logic circuit indicates the occurrence of an RTO event.

11. The automatic rejected takeoff (RTO) system of claim 9, further comprising a comparison unit coupled to the plurality of control units.

12. The automatic rejected takeoff (RTO) system of claim 7, wherein the control unit comprises:
a first logic circuit coupled to the first plurality of sensors for determining if the automatic RTO system is enabled; and
a second logic circuit coupled to the second plurality of sensors for determining the occurrence of the RTO event.

13. The automatic rejected takeoff (RTO) system of claim 12, further comprising a third logic circuit coupled to the first logic circuit and the second logic circuit, wherein the third logic circuit is configured to generate signals to initiate a RTO responsive to a signal from the first logic circuit indicating that the automatic RTO system has been enabled and further responsive to a signal from the second logic circuit indicating that an RTO event has occurred.

14. The automatic rejected takeoff (RTO) system of claim 7, wherein the control unit sends a signal to steer the aircraft down a runway.

15. A method for performing an automatic rejected takeoff (ARTO) of an aircraft, the method comprising:
monitoring a plurality of aircraft status conditions; transmitting an ARTO enabled signal to an ARTO system when all of the monitored status conditions are true;
monitoring a plurality of rejected takeoff (RTO) warning events; transmitting a RTO warning signal to the ARTO system when any one of the RTO warning events is true;
and automatically initiating an ARTO event when both the ARTO enabled signal and the RTO warning signal are received at the ARTO system;
wherein automatically initiating an ARTO event when both the ARTO enabled signal and the RTO warning signal are received at the ARTO system comprises: sending a reverse thrust signal to reverse a thrust of the aircraft; sending a speed brake signal to a speed brake actuation control system of the aircraft; and sending an auto brake signal to an auto brake system of the aircraft.

16. The method of claim 15 wherein the monitored status conditions include an on-ground condition, an aircraft speed is greater than 80 knots condition, an aircraft speed less V1 condition, and V1 is valid condition.

17. The method of claim 16 wherein V1 is valid when entered by the pilot into the ARTO system.

18. The method of claim 15, wherein the RTO warning events comprises one of: a fire on the aircraft, a fire in the aircraft engine, engine failure, abnormal acceleration of the aircraft; tire failure; aircraft structural damage; predictive windshear warning; or flight path obstruction.

19. The method of claim 15, wherein automatically initiating an ARTO event when both the ARTO enabled signal and the RTO warning signal are received at the ARTO system comprises sending a signal to steer the aircraft down a runway.

* * * * *